(12) United States Patent
Kert et al.

(10) Patent No.: US 8,923,176 B2
(45) Date of Patent: Dec. 30, 2014

(54) SAVING POWER IN A WIRELESS COMMUNICATION DEVICE

(75) Inventors: Kaido Kert, San Francisco, CA (US); Karlheinz Wurm, Stockholm (SE)

(73) Assignee: Skype, Dublin (IE)

( * ) Notice: Subject to any disclaimer, the term of this patent is extended or adjusted under 35 U.S.C. 154(b) by 272 days.

(21) Appl. No.: 13/043,242

(22) Filed: Mar. 8, 2011

(65) Prior Publication Data
US 2012/0230236 A1 Sep. 13, 2012

(51) Int. Cl.
*G08C 17/00* (2006.01)
*H04M 1/253* (2006.01)
*H04W 52/02* (2009.01)

(52) U.S. Cl.
CPC ........ *H04M 1/2535* (2013.01); *H04W 52/0248* (2013.01); *H04W 52/0219* (2013.01); *Y02B 60/50* (2013.01)
USPC .......................................... 370/311; 370/468

(58) Field of Classification Search
CPC ....... H04L 67/02; H04L 67/10; H04L 69/161; H04L 47/10; H04L 47/2416; H04L 65/80; H04L 69/14; H04L 12/5693; H04L 5/0037; H04L 1/0026
USPC .................................................. 370/311, 468
See application file for complete search history.

(56) References Cited

U.S. PATENT DOCUMENTS

| | | | | |
|---|---|---|---|---|
| 6,107,960 A | * | 8/2000 | Krasner .................... | 342/357.59 |
| 6,317,415 B1 | * | 11/2001 | Darnell et al. ................. | 370/230 |
| 2001/0052065 A1 | * | 12/2001 | Alexander, III et al. ...... | 712/228 |
| 2004/0131014 A1 | * | 7/2004 | Thompson et al. ........... | 370/230 |
| 2007/0094374 A1 | * | 4/2007 | Karia et al. ................... | 709/223 |
| 2007/0142098 A1 | * | 6/2007 | Behzad et al. ................. | 455/574 |
| 2008/0123610 A1 | * | 5/2008 | Desai et al. ................... | 370/339 |
| 2010/0064154 A1 | * | 3/2010 | King .............................. | 713/320 |
| 2010/0226344 A1 | * | 9/2010 | Nandagopalan .............. | 370/338 |
| 2010/0322124 A1 | * | 12/2010 | Luoma et al. ................. | 370/311 |
| 2011/0122829 A1 | * | 5/2011 | Zetterman et al. ............ | 370/329 |
| 2011/0150107 A1 | | 6/2011 | Jung et al. | |

FOREIGN PATENT DOCUMENTS

EP 2355596 8/2011

OTHER PUBLICATIONS

"International Search Report and Written Opinion", Application No. PCT/EP2012/054201, (May 29, 2012), 10 pages.

* cited by examiner

*Primary Examiner* — Brian J Gillis
*Assistant Examiner* — Thao Duong
(74) *Attorney, Agent, or Firm* — Sonia Cooper; Jim Ross; Micky Minhas

(57) ABSTRACT

A terminal comprises a plurality of hardware I/O units, including a wireless transceiver having a powered-up state in which at least one of a transmit path and a receive path is enabled at the expense of higher power consumption and a powered-down state in which the at least one path is disabled in favor of lower power consumption; a processing apparatus; and a storage medium coupled to the processing apparatus and storing at least a first and a second application, an operating system, a communication protocol layer and a driver layer arranged to be executed on the processing apparatus. The operating system is arranged to arbitrate access by the plurality of applications to the hardware I/O units via the driver layer, including access to the wireless transceiver via the communication protocol layer and driver layer. The second application comprises a wireless traffic scheduler configured to coordinate traffic associated with the second application to be communicated via the wireless transceiver during a same continuous phase of the powered-up state as traffic associated with the first application.

20 Claims, 7 Drawing Sheets

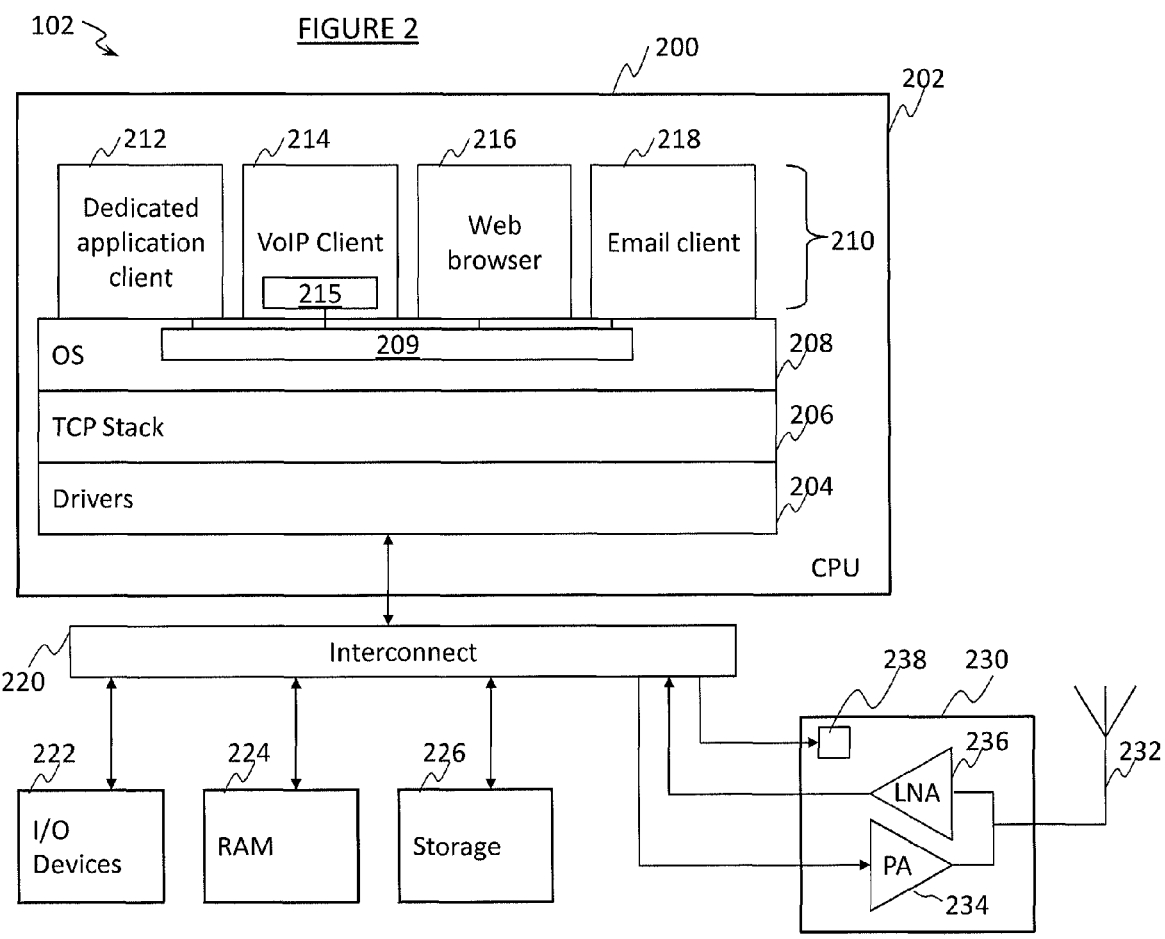

Figure 3a app1 :  .           .                .           .           .
app2 : .   .    .       .      .         .         . .

time------->

Figure 3b app1:  .              .                .          .             .
app2:  .     .   .         .      .    .                     . .

time------->

SAVING POWER IN A WIRELESS COMMUNICATION DEVICE

FIELD OF THE INVENTION

The present invention relates to techniques for saving on power incurred by a wireless transceiver, such as may be useful to conserve battery power in a mobile terminal.

BACKGROUND

In wireless devices, and especially battery-powered mobile devices such as mobile phones, smart phones, tablets and laptops, it is desirable to minimise the power consumption of the device so as to conserve battery life. There may also be other motivations such as limiting the heat generated, which may in turn allow slimmer packaging or cheaper components to be used.

One main subsystem incurring significant power consumption in a wireless device is the radio front-end of the wireless transceiver. On the transmit path this may comprise components such as a power amplifier (PA), a digital-to-analogue converter (DAC) and an up-conversion mixer. On the receive path this may comprise components such as a low-noise amplifier (LNA), an analogue to digital converter (ADC), and a down-conversion mixer. The power amplifier in particular can be the cause of a large portion of the power consumption of the device.

In order to conserve power, it is known to provide the radio transceiver with a mechanism allowing it to be powered down when not in use. The powering up and down of the radio is typically controlled by driver layer software, by writing to a software accessible register arranged to toggle the state of the radio transceiver. The powering down itself may comprise for example switching off a power supply connection to one of the components of the radio transceiver such as the power amplifier, e.g. because such components may draw current even when not being used to transmit or receive signals. The details of the power-down mechanism may vary, but the programmer of the driver software need not necessarily concern him or herself with such details—all he or she needs to know is that when a certain value is written to the relevant register then the radio transceiver is placed into a higher-power state in which it is readied for transmission and/or reception of radio traffic (at the expense of higher power consumption), and that when a certain other value is written to the register then the radio transceiver is placed into a lower-power state in which it is not able to transmit and/or receive radio traffic (in favour of reduced power consumption).

However, the powering up and down operation takes a finite amount of time, and also may itself incur a certain power consumption due to surges in current when turning the radio on or off. Hence it is not generally desirable to turn the radio on and off too frequently.

One regime for controlling the radio is to turn off the radio when triggered by a time-out, i.e. after a certain predetermined period of radio inactivity. However, this has the disadvantage that sporadic traffic could still keep the radio switched on for long amounts of time if each subsequent message keeps falling within the predetermined period.

Another possibility could be for the driver software to queue traffic so as to attempt to transmit and/or receive messages together in bursts, thus allowing more opportunities for powering down the radio between bursts. However, this could have the disadvantage that time-critical traffic could be delayed by an intolerable amount.

SUMMARY

According to one aspect of the present invention, there is provided a terminal comprising: a plurality of hardware I/O units, including a wireless transceiver having a powered-up state in which at least one of a transmit path and a receive path is enabled at the expense of higher power consumption and a powered-down state in which the at least one path is disabled in favour of lower power consumption; a processing apparatus; and a storage medium coupled to the processing apparatus and storing at least a first and a second application, an operating system, a communication protocol layer and a driver layer arranged to be executed on the processing apparatus; wherein the operating system is arranged to arbitrate access by the plurality of applications to the hardware I/O units via the driver layer, including access to the wireless transceiver via the communication protocol layer and driver layer; and wherein the second application comprises a wireless traffic scheduler configured to coordinate traffic associated with the second application to be communicated via the wireless transceiver during a same continuous phase of the powered-up state as traffic associated with the first application.

By displacing responsibility for controlling power up and down of the transceiver higher up the stack to the application layer, it is possible to achieve improved scheduling of the traffic so as to conserve power without disrupting operation, because the scheduling can be based on knowledge of the applications from which the traffic originates. This is unlike anything that could be achieved lower down the stack such as at the driver layer, which has no understanding of which applications have generated which traffic nor indeed any concept of different applications, and so could not know that any attempt it is making to queue traffic into bursts would not have an adverse affect on those applications or their traffic.

Particularly, an advantage of scheduling radio transmission at the application layer is that scheduling can be performed based on knowledge of the application-layer content of the traffic. Hence in a particularly preferred embodiment the wireless traffic scheduler is configured such that the coordination of said traffic is dependent on information of application-layer content of the traffic associated with one or both of the first and second applications.

For example, the scheduling may be based on knowledge of how time critical the content is. Hence in another embodiment the wireless traffic scheduler is configured such that the coordination of said traffic is dependent on whether or to what extent the traffic associated with one or both of the first and second applications is time critical.

E.g. it may be determined that an outgoing presence update or IM chat message from a communication client application is not time critical, whereas an outgoing alert or update from another application such as a bid from a web browser to an auction website or a signal from an online game may be time critical. The scheduler could then re-schedule the non time-critical content to be transmitted together in the same transmission burst as is un-movably scheduled for the time critical traffic. Or in another example, if the powering up of the transmit path is not independent of the powering up of the receive path, then a non time critical presence update or IM message may be scheduled into the same power-up phase as an incoming news or weather report.

In further embodiments, the wireless traffic scheduler may be configured to perform said coordination by: receiving an indication regarding scheduling of first traffic associated with the first application; and determining whether second traffic associated with the second application can be scheduled so as to be communicated via the wireless transceiver during the same continuous phase of the powered-up state as the traffic associated with the first application.

The indication may be received via the operating system.

The indication may be received by the wireless traffic scheduler in the second application querying the first application regarding scheduling of first traffic associated with the first application.

The wireless traffic scheduler may be configured to perform said coordination by: if the traffic associated with the second application cannot be scheduled to a phase already scheduled for the traffic associated with the first application, transmitting a request to the operating system or first application requesting rescheduled communication of the traffic associated with the first application.

In further embodiments, the operating system may also comprise a wireless traffic scheduler configured to participate in said coordination by: receiving requests from the first and second applications for communication of traffic via the wireless transceiver at different respective times; and in conjunction with the wireless traffic scheduler in the second application, rescheduling the traffic associated with the request from the second application to a time other than that of the respective request, so as to be communicated via the wireless transceiver during the same continuous phase of the powered-up state as the traffic associated with the request from the first application.

The wireless traffic scheduler in the operating system may be configured to perform said rescheduling by: receiving one or more requests from the first application to communicate first traffic via the wireless transceiver at one or more first times, and scheduling access at the one or more requested first times; and receiving one or more requests from the second application to communicate second traffic via the wireless transceiver at one or more second times, and returning a response to the wireless traffic scheduler in the second application offering rescheduled communication of the second traffic based on the one or more first times.

The wireless traffic scheduler in the operating system may be configured to perform said rescheduling by: if the wireless traffic scheduler in the second application declines the offered rescheduling, rescheduled communication of the first and second traffic based on consideration of both the one or more first times and one or more second times.

The terminal may comprise a software-accessible register coupled to the processing apparatus and wireless transceiver, wherein the operating system is arranged to control said states by writing to the software-accessible register.

The traffic associated with the second application may be non real time traffic and the traffic associated with the first application may be real time traffic.

The first application may comprise one of: a web-browser, an email client, a dedicated weather report client application, a dedicated news client application, a dedicated stock-ticker client application, and a game.

The second application may comprise a packet-based communication client for conducting voice or video calls or exchanging IM chat messages via a packet-based network.

The traffic associated with the packet-based communication client may comprise at least one of a presence update and an IM message.

The transmit path may comprise a power amplifier, the powered-up state may comprises the power-amplifier being turned on, and the powered down state may comprise the power amplifier being turned off.

According to another aspect of the present invention, there may be provided a terminal comprising: a plurality of hardware I/O units, including a wireless transceiver having a powered-up state in which at least one of a transmit path and a receive path is enabled at the expense of higher power consumption and a powered-down state in which the at least one path is disabled in favour of lower power consumption; a processing apparatus; and a storage medium coupled to the processing apparatus and storing at least a first and a second application, an operating system, a communication protocol layer and a driver layer arranged to be executed on the processing apparatus; wherein the operating system is arranged to arbitrate access by the plurality of applications to the hardware I/O units via the driver layer, including access to the wireless transceiver via the communication protocol layer and driver layer; and wherein at least one of the operating system and the second application comprises a wireless traffic scheduler configured to coordinate traffic associated with the second of said applications to be communicated via the wireless transceiver during a same continuous phase of the powered-up state as traffic associated with the first of said applications.

The wireless traffic scheduler may be implemented at the operating system, and is configured to perform said coordination by: receiving requests from the first and second applications for communication of traffic via the wireless transceiver at different respective times; and rescheduling the traffic associated with the request from the second application to a time other than that of the respective request, so as to be communicated via the wireless transceiver during the same continuous phase of the powered-up state as the traffic associated with the request from the first application.

In embodiments, the wireless traffic scheduler may be configured to perform said rescheduling by: receiving one or more requests from the first application to communicate first traffic via the wireless transceiver at one or more first times, and scheduling access at the one or more requested first times; and receiving one or more requests from the second application to communicate second traffic via the wireless transceiver at one or more second times, and returning a response to the second application offering rescheduled communication of the second traffic based on the one or more first times.

The wireless traffic scheduler may be configured to perform said rescheduling by: receiving one or more requests from the first application to communicate first traffic via the wireless transceiver at one or more first times; receiving one or more requests from the second application to communicate second traffic via the wireless transceiver at one or more second times; and returning a response to the first and second applications offering rescheduled communication of the first and second traffic based on consideration of both the one or more first times and one or more second times.

The wireless traffic scheduler is configured to perform said rescheduling by: if the second application declines the offered rescheduling, returning a response to the first and second applications offering rescheduled communication of the first and second traffic based on consideration of both the one or more first times and one or more second times.

The wireless traffic scheduler is also configured to control the powered up state and powered down state. The terminal may comprise a software-accessible register coupled to the processing apparatus and wireless transceiver, wherein the operating system may be arranged to control said states by writing to the software-accessible register.

According to further aspects of the present invention there are also provided corresponding methods and computer program products being embodied on a non-transient computer-readable medium and configured so as when executed o a processing apparatus to perform such methods.

BRIEF DESCRIPTION OF THE DRAWINGS

For a better understanding of the present invention and to show how it may be put into effect, reference will be made by way of example to the accompanying drawings in which:

FIG. 2 is a schematic block diagram of a user terminal,

FIG. 3a is a schematic representation of scheduled radio traffic,

FIG. 3b is a schematic representation of re-scheduled radio traffic,

DETAILED DESCRIPTION OF PREFERRED EMBODIMENTS

In order to save on a battery life in a battery powered device, it would be desirable to monitor the operation of the device and schedule traffic from a particular application at times when the most intense battery consumption is already being incurred for other reasons, for example due to the action of other applications. Radio antenna wakeups are such operations. In one embodiment, a communication client such as a VoIP (voice-over-IP) or IM (instant messaging) client is configured to monitor when the radio antenna is already active and only then send out burst traffic. This burst traffic could comprise for example presence updates or incoming chat messages which (for the first message at least) don't need to be in real time. These examples concern the radio antenna but the invention potentially could extend to monitoring the entire system (i.e. other hardware resources of the device) to make smart decision to improve battery runtime. This would allow saving a large amount of battery and help standby times on battery devices.

Figure 1:
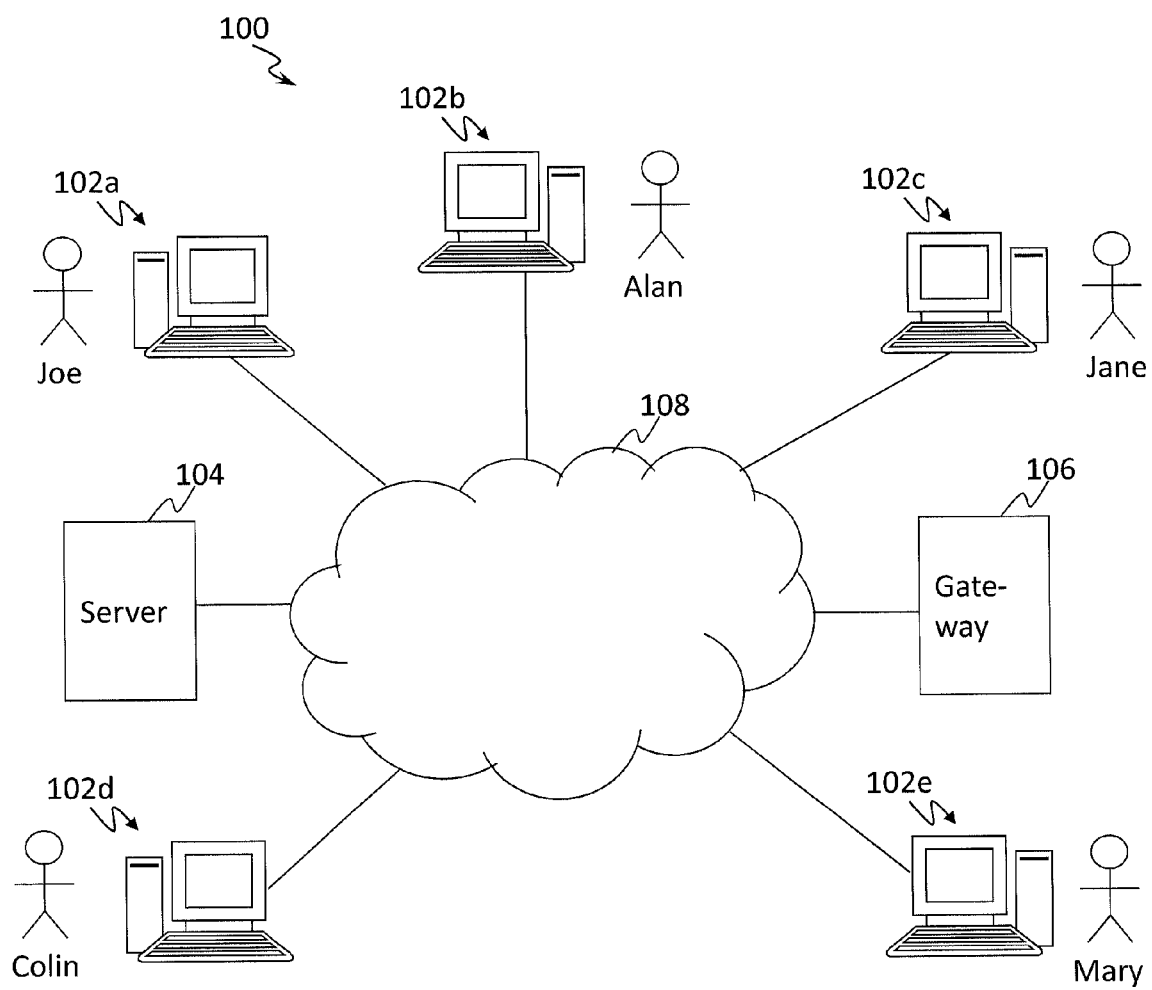
FIG. 1 is a schematic representation of a communication network.

FIG. 1 is a schematic diagram of a communication system 100 in which the present invention may be deployed. The communication system 100 comprises a plurality of end-user terminals 102, of which only few examples 102a, 102b, 102c, 102d and 102e are shown for illustrative purposes but it will be appreciated that many more user terminals 102 will likely be present than shown. Each user terminal 102, server 104 and gateway 106 is connected to the rest of a network 108, which may be a packet-based network such as the Internet, by means of a wired connection or wireless connection such as a wi-fi or cellular connection. According to the described embodiments of the present invention, at least one of the user terminals 102 comprises a wireless transceiver for establishing a wireless connection to the packet-based network 108.

The communication system 100 may also comprise one or more servers 104 and one or more gateways 106 to one or more other networks such as a fixed-line telephone network (not shown). Each of the one or more servers 104 and/or one or more gateways 106 is also connected to the rest of the packet-based network 108 by means of a suitable connection.

Each user terminal 102 is installed with an instance of a communication client application such as a VoIP client or IM client. In particularly preferred embodiments the communication client is a VoIP client with additional IM capability. Each instance of the VoIP client is stored on a non-transient (non-volatile) storage medium of its respective user terminal 102 and arranged for execution on a processing apparatus of that terminal 102. The VoIP client is configured so as when executed to establish a packet-based communication such as a voice or video call or IM message with another user terminal 102 or with a more conventional telephone via the gateway 106, via the packet-based network 108. This may involve looking up information such as contact information and/or an IP addresses for the other user, by querying either a server 104 and/or in the case of peer-to-peer system querying a distributed database distributed amongst other end user terminals 102 (not necessarily participants of the call). Details of suitable call set-up and messaging mechanisms for establishing packet-based communications will be familiar to a person skilled in the art.

FIG. 2 is a schematic block diagram showing more detail of a user terminal 102 according to a preferred embodiment of the present invention. The user terminal 102 comprises a processing apparatus 202 in the form of a CPU having one or more cores; and a non-volatile storage medium 226 such as an electronic memory (e.g. flash memory or other EEPROM), magnetic memory device (e.g. hard drive or disk drive) and/or optical storage device (e.g. CD ROM). The storage medium stores various items of software arranged to be executed on the processing apparatus 202, to be discussed shortly. The user terminal 102 also comprises an interconnect system 220 which may comprise a bus, DMA engine and/or dedicated wired connections; and a RAM 224 into which software from the storage medium 226 may be loaded temporarily for execution on the processing apparatus 202. The storage medium 226, RAM 224 and processing apparatus 202 are interconnected by the interconnect 220. The user terminal 102 further comprises a plurality of hardware resources in the form of a wireless transceiver 230 and optionally one or more other input and/or output (I/O) units 222. The wireless transceiver may comprise for example a wi-fi or Bluetooth transceiver, or other such short range or "ad hoc" radio transceiver; and/or a cellular transceiver for communicating with a base station of a wireless cellular mobile network. The wireless transceiver preferably enables access to packet-based communications via the packet-based network 108, e.g. for the purpose of VoIP calls, IM messaging, email or web access. The other I/O devices 222 may comprise one or more of a wired modem, screen or touch-screen, web cam, audio speaker, and/or microphone. Each of the hardware resources 222, 230 is connected to the processing apparatus 202 via the interconnect 220 so as to enable communication of data between the resource 222, 230 and any relevant software running on the processing apparatus 202.

The storage device 226 stores: a driver layer 204 in the form of one or more drivers for each of the hardware resources 222, 230; a communication protocol layer 206 in the form of a TCP stack; an operating system (OS) 208 (also referred to as a kernel); and an application layer 210 comprising a plurality of client applications such as an email client 218, a web browser 216, a VoIP and/or IM client 214, and a dedicated application client 212. The dedicated application client 212 could comprise for example a weather report application for receiving weather updates via the Internet 108, a news application for receiving news updates via the Internet 108, or a stock ticker application for receiving up-to-date stock or share information via the Internet 108. The updates from such applications 212 may be received via the wireless transceiver 230 in real-time, i.e. "on the fly" as and when corresponding events occur. In another example the dedicated application client 212 could comprise a game application which involves live online play, in which case the game may transmit and/or receive real-time game signals to and/or from a server and/or other user terminals 102 via the wireless transceiver 230 and Internet 108.

As will be familiar to a person skilled in the art, the software is considered to form a hierarchical stack, from the driver layer 204 at the lowest level to the application layer 210 at the highest level:

| | |
|---|---|
| Applications Layer | 210 |
| Operating System (OS) | 208 |
| TCP (sub)stack | 206 |
| Driver Layer | 204 |

When executed on the processing apparatus 202, the drivers 204 act so as to provide the immediate interface to the hardware resources. On top of the driver layer 204 is the TCP stack 206. The TCP stack 206 is a sub-stack of communication protocols such as a transport protocol and Internet Protocol (IP) for performing communications via the internet (at least for interactions via the wireless transceiver 230 or via a wired modem). The operating system 208 is configured so as when executed to schedule the different applications 210 for execution and to arbitrate access by the different applications 210 to the underlying hardware resources 222, 230 via the relevant driver 204. That is, an application 210 cannot unilaterally access the hardware resources 222, 230 but must request access via the operating system 208. The applications 210 are distinct from any software operating at lower level in the stack in that they are responsible for performing the actual, high-level, user-facing functions of the device, and furthermore in that they are arbitrated in the above-described manner by the operating system 202. The operating system 208 is distinct from any software at lower level because it responsible for managing execution of the applications 210 and arbitrating between applications 210, whereas by the stage that data has reached the TCP layer 206 or driver layer 204 then information about the existence of different applications 210 and their nature has been lost—the TCP stack 206 and drivers 204 have no knowledge (or reason to care) about which applications 210 different signals or traffic are associated with. The different applications 210 (212, 214, 216 and 218) are distinct from one another in that they are independently executable, even if they can communicate with one another. I.e. execution of one application 210 does rely on necessary execution of another. The different applications may also be scheduled separately for execution under control of the operating system 208. From the perspective of the user the different applications 210 have different user-facing functions, e.g. web, email, VoIP, etc.

According to an embodiment of the present invention, at least one of the applications such as the VoIP and/or IM application 214 comprises a radio traffic scheduler 215, implemented in the application layer 210 at a level where it can have access to information about others of the different multiple applications 210 and/or the content of the traffic being transmitted to and/or from those applications 210.

Alternatively or additionally, the operating system 208 comprises a radio traffic scheduler 209, implemented in the operating system 208 at a level where it can also have access to information about the different multiple applications 210 and/or the content of the traffic being transmitted to and/or from those applications 210. In this case the traffic scheduler 209 is arranged to receive requests from the applications 210 for access to the wireless transceiver 230, requesting to transmit and/or receive traffic via the wireless transceiver 230. The request may request access for the traffic now (at the time of the request) or at some future time or times specified in the request. For example the request could request access at a predetermined pattern of times, such as at predetermined regular intervals of time, e.g. one every certain number of milliseconds. The radio traffic scheduler 209 is then configured to respond to an application 210 by either granting access, denying access or offering an alternative, re-scheduled time for the traffic.

The aim of the traffic scheduler 215 and/or 209 is to reschedule the traffic of one or more of the applications 210 so as to schedule the traffic associated with two or more different applications 210 into the same powered-up "burst" of the wireless transceiver 230 (rather than requiring the wireless transceiver 230 to be powered up to transmit or receive one application's traffic, then powered down, then powered up to transmit or receive the other application's traffic; or indeed without having to leave the wireless transceiver powered up but idle for long periods of time). For example, an intended transmission from a second application 214 such as the VoIP and/or IM application may be rescheduled to be part of the same burst as traffic already scheduled to be transmitted or received to or from a first application such as the dedicated application 212.

As shown in FIG. 2, the wireless transceiver 230 comprises at least one antenna 232, a transmit path comprising components such as a power amplifier (PA) 234, and a receive path comprising components such as a low-noise amplifier (LNA) 236. The output of the power amplifier 234 is operatively coupled to the antenna 232 and the input of the power amplifier 234 is operatively coupled to the interconnect 234. The transmit path would typically also comprise other components such as a digital-to-analogue converter (DAC) and an up-conversion mixer (not shown). The wireless transceiver 230 is thereby arranged to enable data to be transmitted from the applications 210 running on the processing apparatus 202 to be transmitted over an air interface, e.g. a wi-fi, Bluetooth or cellular channel so as to communicate via the packet-based network 108. The low-noise amplifier 236 has an input operatively coupled to the antenna 232 and an output operatively coupled to the interconnect 220. The receive path would typically also comprise other components such as an analogue to digital converter (ADC) and a down-conversion mixer (not shown). The wireless transceiver 230 is thereby arranged to enable data to be received over the air interface by the applications 210 running on the processing apparatus 202, so as to receive incoming communications via the packet-based network 108.

In addition to the above, the wireless transceiver 230 further comprises a software accessible register 238 (e.g. accessible by way of an address to which the software can write data). The register 238 could for example be implemented in or proximate the wireless transceiver 230 and accessed via an interconnect such as a bus or DMA engine, or could be implemented in or proximate the CPU 202 and have its output connected to the wireless transceiver via a dedicated hardware connection. Either way, the register 238 and wireless transceiver 230 are operatively coupled and arranged such that when a certain value is written to the register 238 the wireless transceiver 230 is set to a powered-up state in which at least one of the transmit path and receive path is enabled at the expense of higher power consumption, and when another value is written to the register 238 then the wireless transceiver 230 is set to a powered-down state in which the at least one path is disabled in favour of lower power consumption. The register 238 may only need a one-bit flag to do this. The powered up state may involve turning on a power supply the power amplifier 234 and/or low-noise amplifier 236, and the powered-down state may comprise turning off the power supply to the power amplifier 234 and/or low-noise amplifier (which could mean turning down to an inoperative level). The powering up and down of the power amplifier 234 or transmit path generally may or may not be independent of the powering up and down of the low noise amplifier or receive path generally. In the higher-power state the wireless transceiver 230 is readied for transmission and/or reception of radio traffic but draws current even when not actually transmitting or receiving (i.e. when idle), and in the lower-power state the wireless transceiver 230 is not able to transmit and/or receive radio traffic but draws less current.

The register 238 may conventionally only be written by the driver layer 204, but according to embodiments of the present invention the register 238 is written by the radio traffic scheduler 209 in the operating system 208 given its visibility of the different applications 210 requiring wireless traffic.

As discussed above, it typically takes a finite and not-insignificant amount of time to power up and down (powering up the wireless transceiver 230 may also be referred to as "waking up" or a "wakeup" operation). Furthermore, there may also be a power cost associated with the power down and wake up operations themselves, e.g. due to power surges. It is therefore desirable not to flit between states too frequently or frivolously. On the other hand it is desirable not to leave the wireless transceiver 230 in the higher-power state for too long between bursts of traffic.

To this end, the radio traffic scheduler 215, 209 in the second application 214 and/or operating system 208 is configured to negotiate or otherwise coordinate a common transmission burst for traffic from at least two different applications 210. Transmission at the same time or in the same burst means as part of the same continuous powered-up phase of the wireless transceiver, i.e. without powering down in between the traffic from the two or more different applications 210. This could also be considered as coordinating the traffic into the same transmission time slot. It is achieved not by (or least not only by) lengthening the powered-up phase of the wireless transceiver 230, but by rescheduling the traffic from at least one (and potentially more) of the different applications 210 (though the radio traffic scheduler 209 may also be configured to be able to stretch the powered-up phase to a lesser extent than would have been required without rescheduling of traffic). Preferably the traffic from the two or more applications 210 is transmitted back-to-back, i.e. without a substantial time gap so as to not waste power keeping the wireless transceiver 230 needlessly powered up whilst idle.

An example of this idea is illustrated schematically in FIGS. 3a and 3b. Each dot represents a continuous phase of the power-up state of the wireless transceiver 230 (i.e. a burst or time slot). The first line of dots in FIGS. 3a and 3b represents the scheduling of wireless traffic requested by a first application such as the dedicated application 212. The second line of dots in FIGS. 3a and 3b represents the scheduling of wireless traffic desired by a second application such as the VoIP or IM client 214. The time axis runs from left to right. E.g. the first line could represent game signals or weather reports and the second line could represent presence updates or IM messages.

However, if the wireless transceiver was woken up and then powered down for every one of these requested time slots, then there would be substantial cost in terms of power consumption (and therefore battery life in a portable terminal).

Therefore the radio traffic scheduler 215 and/or 209 is configured to negotiate or otherwise coordinate a rescheduling of the traffic to the timing shown in FIG. 3b. Here it is illustrated that at least some of the requested transmission slots have been rescheduled to a time other than requested. Of course the traffic may not be communicated exactly simultaneously, but are communicated as part of the same powered-up phase of the wireless transceiver 230 and preferably back-to-back. So the time of the requested traffic of one application, that would otherwise have fallen outside the powered-up phase that would have resulted from request of another application, has been moved to a more power-efficient time where a powered-up phase or slot of the wireless transceiver 230 can be shared. The radio traffic scheduler 215 and/or 209 in the second application 214 or operating system 208 is configured to actively coordinate traffic, which means traffic does not just happen by chance to coincide, but is actively controlled such that coincidence is ensured. Hence as shown in FIG. 3b, the rescheduled traffic for the two applications 210 is now more efficiently aligned in time.

An advantage of scheduling radio transmission at the application layer 210 or operating system layer 208 is that scheduling can be performed based on knowledge of the application-layer content of the traffic. For example, the invention finds a particularly advantageous use case when the traffic associated with one of the applications in question is real time traffic, i.e. traffic having a certain time-critical nature which means that if late it will cease to be functional or relevant or at least have its efficacy impeded.

E.g. it may be determined that an outgoing presence update or IM chat message from a communication client application is not time critical, whereas an outgoing alert or update from another application such as a bid from a web browser to an auction website or a signal from an online game is time critical. The scheduler could then re-schedule the non time-critical content to be transmitted together in the same transmission burst as is un-movably scheduled for the time critical traffic. Or in another example, if the powering up of the transmit and receive paths is linked, a non-time critical presence updated or IM message may be scheduled into the same power-up phase as an incoming real-news bulletin, weather update or stock update, all of which may comprise real-time, information.

In a preferred embodiment, the radio traffic scheduler 215 is implemented in the second application 214, e.g. VoIP and/or IM application, with litter or no modification to the operating system 208 or first application 212 (or other applications 210). In this case the radio traffic scheduler 215 is not configured to negotiate with the OS 208 or other applications 212, 210, but rather to react to scheduling of traffic by other applications 212,210 so as to schedule its own non-real time traffic to follow the timing that is already being requested independently by one or more other applications 212, 210.

Figure 4A:
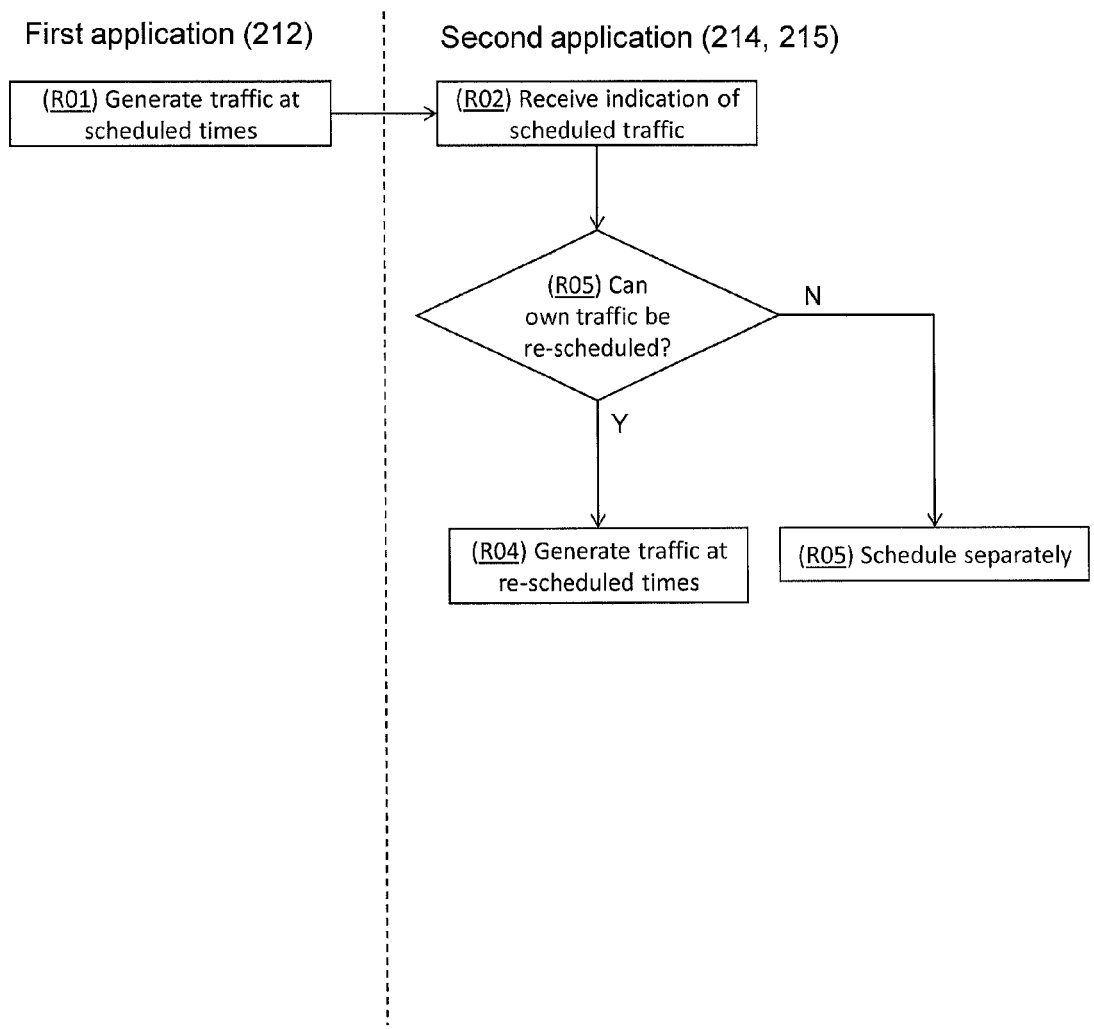
FIGS. 4a and 4b are flow charts of a method of re-scheduling radio traffic.
Figure 4B:
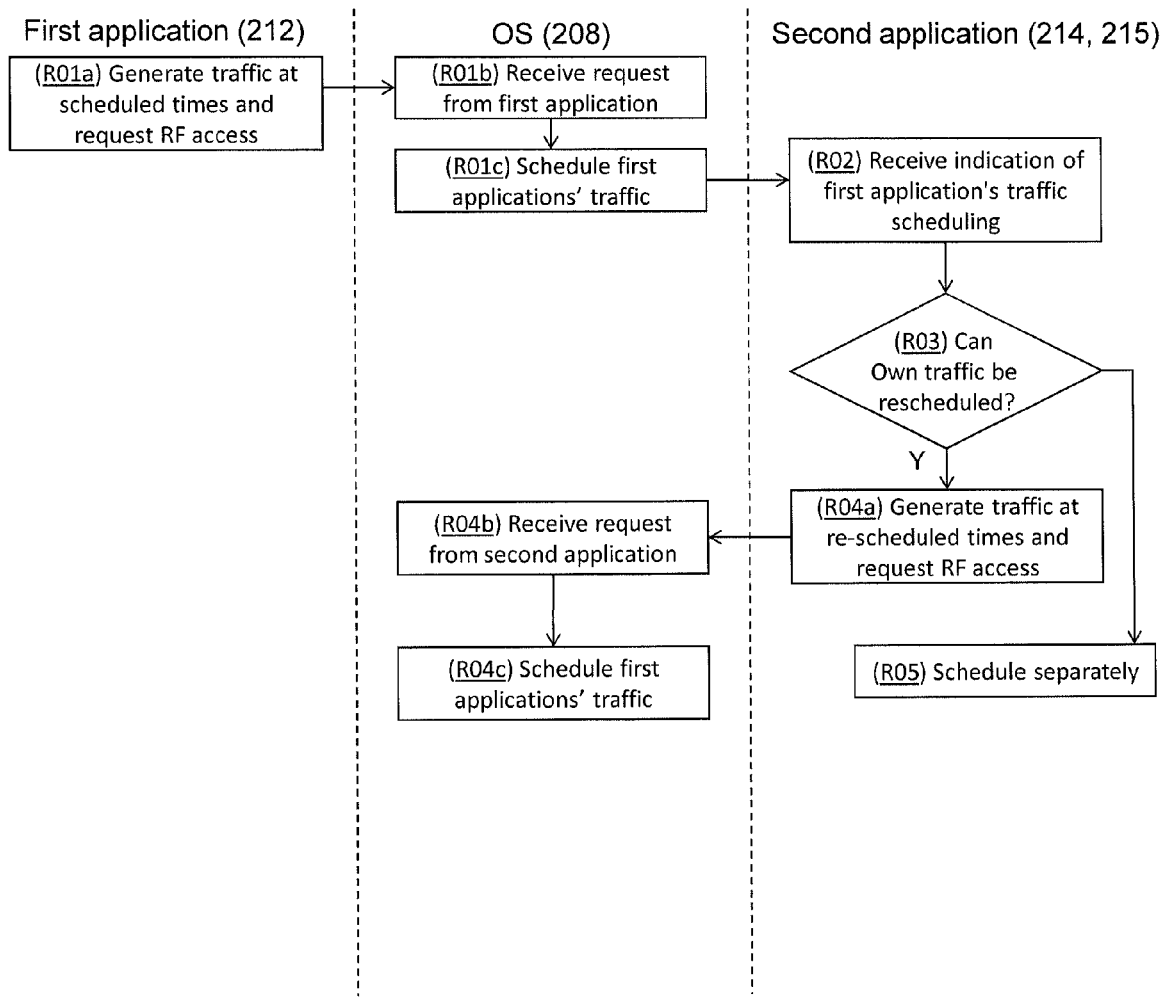

An example method which the traffic scheduler 215 may be configured to perform when executed is illustrated in the schematic flow charts of FIGS. 4a-4b.

At step R01 in FIG. 4a, the first application 212 generates traffic scheduled for some specified time or times (e.g. a predetermined pattern of times). At step R02, the second application receives an indication of this time or times. At step R03, the second application 214 determines whether it can reschedule any of its own traffic to the same transmission burst as the indicated traffic from the first application 212. If so the second application 214 generates and schedules its own traffic accordingly at step R04. Otherwise the second application may schedule its traffic separately at step R05.

The receiving of the indication from the first application 212 is preferably achieved via the operating system 208, rather than requiring a new protocol to be implemented in the first application 212. This is broken down in FIG. 4b.

At step R01a in FIG. 4b, the first application 212 sends a first request down the stack to the operating system 208, requesting access to the wireless transceiver 230 at some specified time or times (e.g. a predetermined pattern of times). At step R01b the operating system 208 receives the first request from the first application 212. At step R01c the operating system 208 schedules access to the RF transceiver 230 accordingly and also makes an indication of the time or times scheduled for the first application's traffic available to the second application 214. This could involve the operating system 208 sending a message with the required indication to the second application 214, or the second application querying the operating system 208, or more preferably to avoid unnecessary extra protocol the second application 214 may read the indication from an application-accessible location of the operating system 208.

Steps R03-R05 may then proceed as set out in relation to FIG. 4a. Step R04 may comprise, at step R04a, the second application 214 sending a second request down the stack to the operating system 208 requesting access to the wireless transceiver 230 at the coordinated time or times; at step R04b the operating system 208 receiving the second request from the second application 214; and at step R04c the operating system 208 scheduling access to the RF transceiver 230 accordingly.

In an alternative embodiment the radio traffic scheduler 209 is configured to offer rescheduling to one or more of the two or more applications 210 in question to check that the proposed rescheduling is acceptable to that application. Based on a response to the offer, the radio traffic scheduler 209 is thus able to ensure the rescheduling is dependent on the nature of the application 210 and/or the content of its associated traffic before enforcing any particular schedule (though in this embodiment the radio traffic scheduler 209 in the operating system 208 is preferably still the ultimate arbiter). In certain embodiments the radio traffic scheduler 209 may be configured to propose compromise scheduling to both applications 210 if neither can accept the scheduling of the other.

Figure 5:
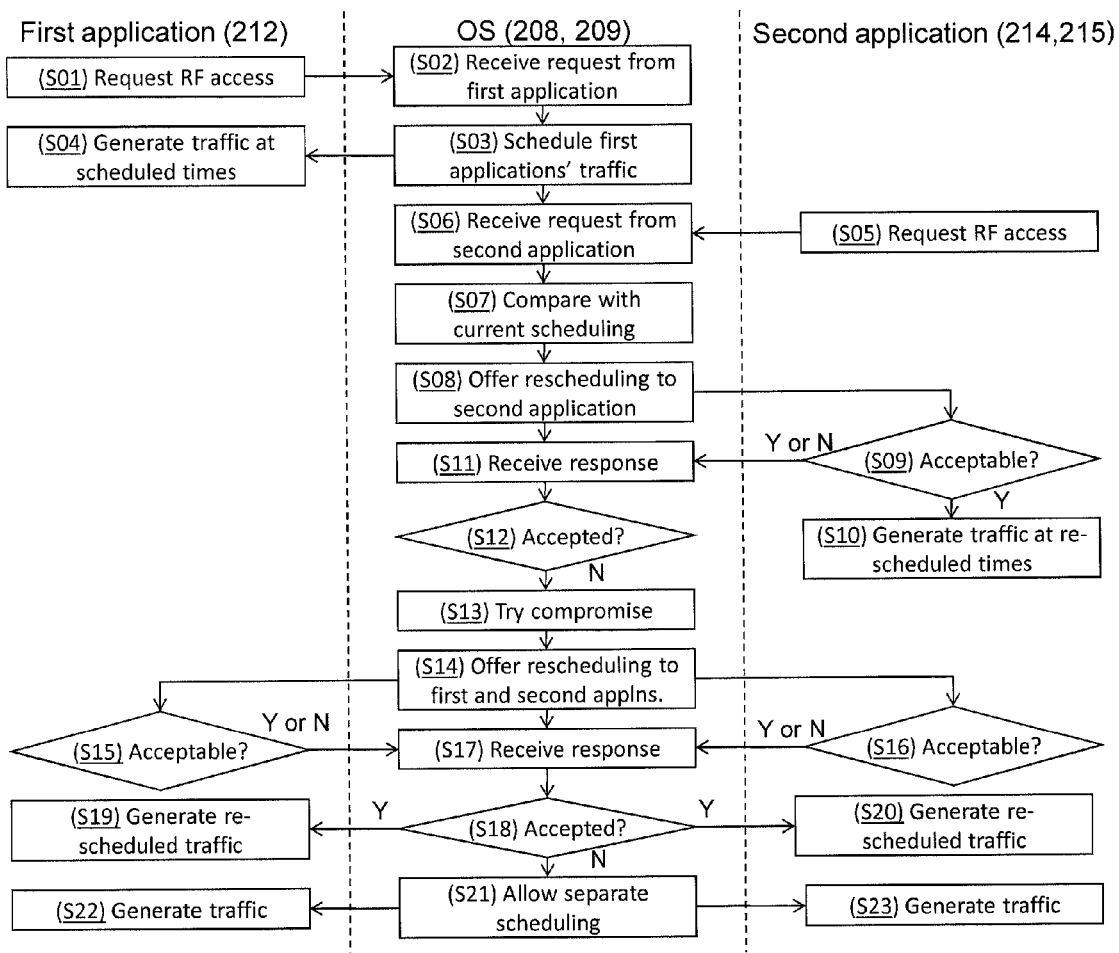
FIG. 5 is a flow chart of another method of re-scheduling radio traffic.

An example method which the traffic scheduler 209 may be configured to perform when executed is illustrated in the schematic flow chart of FIG. 5.

At step S01 in FIG. 5, a first application 212 sends a first request down the stack to the radio traffic scheduler 209 in the operating system 208, requesting access to the wireless transceiver 230 at some specified time or times (e.g. a predetermined pattern of times). At step S02 the radio traffic scheduler 209 receives the first request at the OS layer 208 from the first application 212. At step S03 the radio traffic scheduler 209 determines (by way of example) that no other radio traffic is currently scheduled and sends a response back up the stack from the OS layer 208 to the first application 212 granting access at the requested time or times. At step S04, the first application 212 receives the response and begins generating its scheduled traffic accordingly (in embodiments the application may actually wait until the schedule time to generate the traffic, rather than generating the traffic early then queuing it until the scheduled time).

At a later time at step S05, a second application 214 sends a second request down the stack to the radio traffic scheduler 209 in the operating system 208, requesting access to the wireless transceiver 230 at some other specified time or times (e.g. a predetermined pattern of times). At step S06 the radio traffic scheduler 209 receives the second request at the OS layer 208 from the second application 214. At step S07 the radio traffic scheduler 209 determines (by way of example) that the time or times requested by the second application 214 fall outside of the powered-up phase of phases of the wireless transceiver 230 already scheduled for the traffic associated with the first application 212. Based on this determination, at step S08 the radio traffic scheduler 209 responds back up the stack to the from the OS layer 208 to the second application 214 offering the time or times (i.e. bursts/phases) already scheduled for the first application 212 as an alternative scheduling for use by the second application 214. At step S09 the second application 214 determines whether this offered rescheduling is acceptable, e.g. based on how time critical the traffic associated with the second application 214 is, and either way responds with a further message back down the stack to the radio traffic scheduler 209 accepting or declining the offer. If the offer is acceptable, at step S09, the second application 214 begins generating its scheduled traffic accordingly (again, in embodiments the application may actually wait until the schedule time to generate the traffic, rather than generating the traffic early then queuing it until the scheduled time).

At step S11 the radio traffic scheduler 209 receives the response from the second application 214, and at step S12 determines whether it was accepted or declined by the second application 214. If the offer is declined by the second application 214, e.g. because its traffic is too time critical, then in embodiments the radio traffic scheduler 209 may attempt to determine a compromise solution that might be acceptable to both the first and second application 212 and 214. For example if the first application 212 has already had some time t allocated for transmission of certain traffic, and the second application 214 now requests another time t+n, the radio traffic scheduler 209 may determine a proposed compromise rescheduling t+(n/2) to offer for the traffic from both the first and second applications 212 and 214. This may be conditional for example on the compromise time difference n/2 being within a certain predetermined time window of the first application's scheduled time and/or the second application's requested time. Assuming any such conditions are met, at step S14 the radio traffic scheduler transmits another offer (the compromise offer) up the stack from the OS layer 208 to the first application 212 and the second application 214. The compromise process could be performed for a single requested time or for a pattern of requested times.

At step S15 the first application 212 receives the compromise offer and determines whether it is acceptable, and either way responds back down the stack to the radio traffic scheduler 209 in the OS layer 208. Similarly, at step S16 the second application 214 receives the compromise offer and determines whether it is acceptable to it, and either way again responds back down the stack to the radio traffic scheduler 209 in the OS layer 208. The radio traffic scheduler 209 receives the responses to the compromise offer at step S17, and at step S18 determines whether both the first and second applications 212 and 214 accepted or declined and sends a further message informing both applications 212, 214 of the result. If the compromise offer was acceptable to both the first application 212 and the second application, at step S19 the first application 212 receives the message and begins generating its re-scheduled traffic accordingly, and similarly at step S20 the second application 214 receives the message and begins generating its re-scheduled traffic accordingly.

If the compromise was not accepted by either of the first and second applications 212, 214 however, then at step S21 the radio scheduler 209 has to decide how to resolve the stalemate. The radio traffic scheduler may in this scenario simply allow separate scheduling of the traffic associated with the first and second applications 212, 214 at the different requested times, and simply have to accept the extra power that will have to be incurred in powering up and down the wireless transceiver 230 in between the traffic from each of the two applications 212, 214. Alternatively, depending on a priority level assigned to one or both of the two applications 212, 214 for example, the radio traffic scheduler 209 could decide that it is going to force one of the applications 212, 214 to accept the other's timing, or force both to accept the compromise timing. The OS layer 208 is the ultimate arbiter of access to hardware resources so preferably the applications 210 do not have the right to force their own scheduling.

An alternative or additional set of steps that could be included in the above process (but are not shown in FIG. 4) would be for the radio traffic scheduler to offer the scheduling to requested by the second application 214 to the first application.

Also, the process may be repeated each time a third or further application 216 or 218 requests access to the wireless transceiver 230, so as to negotiate a common power-up phase of the wireless transceiver for use by three or more applications 210.

According to another alternative embodiment, the radio traffic scheduler is implemented in one of the applications 210 such as the VoIP or IM client 214 as in the embodiment of FIG. 4, but may be configured to negotiate with one or more of the other applications 210 such as the first application 212. This may also involve some modification to the first application in order to participate in the negotiation. In this case the radio traffic scheduler is configured to communicate with one or more of the other applications 210, e.g. the dedicated application 212, to negotiate the rescheduling of the traffic associated with one or more of the applications 210 in question (either its own traffic and/or that of one of the one or more other applications). Again, the aim is to reschedule the traffic of one or more of the applications 210 so as to schedule the traffic associated with two or more different applications 210 into the same continuous powered-up "burst" of the wireless transceiver 230, as illustrated in the example of FIG. 3b. In this embodiment the register 238 may be written by the relevant application 210 rather than the OS 208 or driver layer 204.

Figure 6:
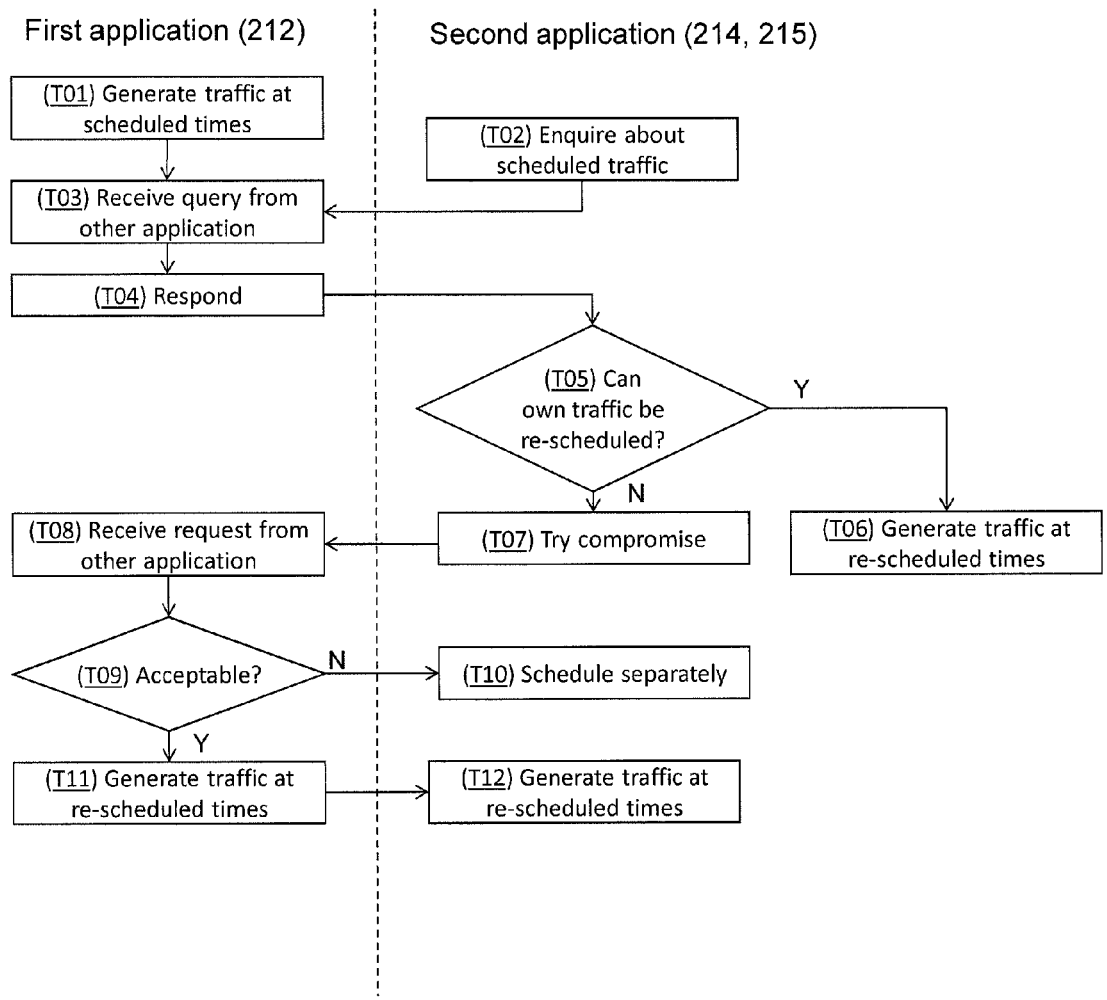
FIG. 6 is a flow chart of another method of re-scheduling radio traffic.

An example method which a traffic scheduler implemented at the application layer 210 may be configured to perform when executed is illustrated in the schematic flow chart of FIG. 6.

At step T01 in FIG. 6, the first application 212 begins generating traffic at a certain scheduled time or times. At step T02 the second application 214 determines that it has certain traffic requiring access to the wireless transceiver 230, and the radio traffic scheduler implemented in the second application 214 sends a query message to the first application 212 to enquire at what time or times it is already planning to use a power up phase of the wireless transceiver 230. The first application 212 receives this query at step T03, and at step T04 it responds back to the second application 214 with an indication of its currently scheduled time or times (e.g. a predetermine pattern of times).

Based on the response from the first application 212, at step T05 the second application 214 determines whether it would be prepared to schedule its own traffic to coincide with the times (i.e. bursts/phases) already scheduled for the first application 212. If so, at step S06 the second application 214 begins generating its traffic at times scheduled to coincide with that of the first application 212.

If not however, the radio traffic scheduler implemented in the second application 214 may attempt to determine a compromise scheduling in a similar manner as discussed above, i.e. to try to find a proposed time between a time already scheduled for use by the first application 212 and a time preferred by the second application 214 for its traffic. The radio traffic scheduler in the second application 214 sends this compromise proposal to the second application 214. Alternatively or additionally, the radio traffic scheduler in the second application 214 could just send its own preferred scheduling time or times as the proposal. The first application 212 receives proposed rescheduling message at step T08, and at step T09 determines whether this is acceptable to the first application 212 (e.g. depending on how time critical the traffic associated with the first application 212 is).

If the proposal is not acceptable to the first application 212, it responds as such to the second application 214. At step T10 the second application then just begins generating its own traffic at independently scheduled times. If the proposal is acceptable to the first application 212 however, then at step T11 the first application switches to generating its traffic at the rescheduled times set out in the proposal. It also responds to the second application 214, so that at step T12 the second application can also begin generating traffic at the proposed times.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

It will be appreciated that the above embodiments have been described only by way of example. Other variations may become apparent to a person skilled in the art given the disclosure herein. The scope of the present invention is not limited by the described embodiments but only by the appendant claims.

What is claimed is:

1. A terminal comprising:
   a plurality of hardware I/O units, including a wireless transceiver having a powered-up state in which at least one of a transmit path and a receive path is enabled for higher power consumption and a powered-down state in which the at least one path is disabled for lower power consumption;
   a processing apparatus; and
   a storage medium coupled to the processing apparatus and storing at least a first application and a second application, an operating system, a communication protocol layer, and a driver layer configured to be executed on the processing apparatus;

the operating system configured to arbitrate access by the plurality of applications to the hardware I/O units via the driver layer, and to arbitrate access by the plurality of applications to the wireless transceiver via the communication protocol layer and driver layer; and the second application comprising a wireless traffic scheduler configured to:
 receive an indication regarding scheduling of the traffic associated with the first application, the indication received by the wireless traffic scheduler in the second application responsive to the wireless traffic scheduler querying the first application regarding scheduling of the traffic associated with the first application;
 determine whether the traffic associated with the second application can be scheduled for communication via the wireless transceiver during a same continuous phase of the powered-up state as the traffic associated with the first application; and
 coordinate traffic associated with the second application to be communicated via the wireless transceiver during the same continuous phase of the powered-up state as traffic associated with the first application based on whether or to what extent the traffic associated with one or both of the first and second applications is time critical, the wireless traffic scheduler configured to coordinate traffic by rescheduling the traffic associated with the second application to be communicated, at a time later than a scheduled time, via the wireless transceiver during the same continuous phase of the powered-up state as the traffic associated with the first application if the traffic associated with the second application is not time critical.

2. The terminal of claim 1, wherein the wireless traffic scheduler is configured to coordinate said traffic based on information of application-layer content of the traffic associated with one or both of the first and second applications.

3. The terminal of claim 1, wherein the wireless traffic scheduler is configured to coordinate said traffic by:
 transmitting a request to the operating system or to the first application requesting rescheduled communication of the traffic associated with the first application if the traffic associated with the second application cannot be scheduled to a phase already scheduled for the traffic associated with the first application.

4. The terminal of claim 1, wherein the operating system includes an additional wireless traffic scheduler configured to participate in said coordination by:
 receiving requests from the first and second applications for communication of traffic via the wireless transceiver at different respective times; and
 in conjunction with the wireless traffic scheduler in the second application, rescheduling the traffic associated with the request from the second application to a time other than that of the respective request, to enable communication via the wireless transceiver during the same continuous phase of the powered-up state as the traffic associated with the request from the first application.

5. The terminal of claim 4, wherein the additional wireless traffic scheduler in the operating system is configured to perform said rescheduling by:
 receiving one or more requests from the first application to communicate first traffic via the wireless transceiver at one or more first times, and scheduling access at the one or more requested first times; and
 receiving one or more requests from the second application to communicate second traffic via the wireless transceiver at one or more second times, and returning a response to the wireless traffic scheduler in the second application offering rescheduled communication of the second traffic based on the one or more first times.

6. The terminal of claim 5, wherein the additional wireless traffic scheduler in the operating system is configured to perform said rescheduling by:
 if the wireless traffic scheduler in the second application declines the offered rescheduling, rescheduling communication of the first and second traffic based on consideration of both the one or more first times and one or more second times.

7. The terminal of claim 1, further comprising a software-accessible register coupled to the processing apparatus and wireless transceiver, wherein the operating system is arranged to control said states by writing to the software-accessible register.

8. The terminal of claim 1, wherein the traffic associated with the second application is non-real time traffic and the traffic associated with the first application is real time traffic.

9. The terminal of claim 1, wherein the first application comprises one of: a web-browser, an email client, a dedicated weather report client application, a dedicated news client application, a dedicated stock-ticker client application, or a game.

10. The terminal of claim 1, wherein the second application comprises a packet-based communication client for conducting voice or video calls or exchanging IM chat messages via a packet-based network.

11. The terminal of claim 10, wherein the traffic associated with the packet-based communication client comprises at least one of a presence update or an IM message.

12. The terminal of claim 1, wherein the transmit path comprises a power amplifier, the powered-up state comprises the power-amplifier being turned on, and the powered down state comprises the power amplifier being turned off.

13. A method comprising:
 receiving, from a first application of a device, an indication regarding scheduling of first traffic associated with the first application, the indication received by a wireless traffic scheduler in a second application of the device responsive to the wireless traffic scheduler querying the first application regarding scheduling of the traffic associated with the first application;
 determining whether second traffic associated with a second application is time critical; and
 if the second traffic is not time critical, rescheduling the second traffic for communication via a wireless transceiver, at a time later than a scheduled time of the second traffic, during a same continuous phase of a powered-up state of the wireless transceiver as the first traffic associated with the first application.

14. A computing device comprising:
 a wireless transceiver having a powered-up state in which at least one of a transmit path and a receive path is enabled, and a powered-down state in which the at least one of the transmit path and the receive path is disabled;
 at least a memory and a processor configured to implement a first application, a second application, and a wireless traffic scheduler associated with the second application;
 the wireless traffic scheduler configured to
  receive an indication regarding scheduling of the traffic associated with the first application, the indication received by the wireless traffic scheduler in the second application responsive to the wireless traffic scheduler querying the first application regarding scheduling of the traffic associated with the first application;

determine whether the traffic associated with the second application can be scheduled for communication via the wireless transceiver during a same continuous phase of the powered-up state as the traffic associated with the first application; and reschedule non-time-critical traffic of the second application to be communicated, at a time later than a scheduled time of the non-time-critical traffic, during the same continuous phase of the powered-up state of the wireless transceiver as traffic associated with the first application.

15. The computing device of claim 14, wherein the wireless traffic scheduler is configured to reschedule the non-time-critical traffic by:

transmitting a request to an operating system of the computing device or to the first application requesting rescheduled communication of the traffic associated with the first application if the traffic associated with the second application cannot be scheduled to a phase already scheduled for the traffic associated with the first application.

16. The computing device of claim 14, wherein the wireless traffic scheduler is configured to coordinate said traffic based on information of application-layer content of the traffic associated with one or both of the first and second applications.

17. The computing device of claim 14, wherein the transmit path comprises a power amplifier, the powered-up state comprises the power-amplifier being turned on, and the powered down state comprises the power amplifier being turned off.

18. The computing device of claim 14, wherein the first application comprises one of: a web-browser, an email client, a dedicated weather report client application, a dedicated news client application, a dedicated stock-ticker client application, or a game.

19. The computing device of claim 14, wherein the second application comprises a packet-based communication client for conducting voice or video calls or exchanging IM chat messages via a packet-based network.

20. The computing device of claim 19, wherein the traffic associated with the packet-based communication client comprises at least one of a presence update or an IM message.

* * * * *